（12）United States Patent
Filippone

(10) Patent No.: US 12,087,461 B2
(45) Date of Patent: Sep. 10, 2024

(54) POWER CONVERSION SYSTEM

(71) Applicant: Claudio Filippone, College Park, MD (US)

(72) Inventor: Claudio Filippone, College Park, MD (US)

(73) Assignee: CARBON FREE HOLDINGS LLC, Lewes, DE (US)

( * ) Notice: Subject to any disclaimer, the term of this patent is extended or adjusted under 35 U.S.C. 154(b) by 0 days.

(21) Appl. No.: 18/343,715

(22) Filed: Jun. 28, 2023

(65) Prior Publication Data

US 2023/0360814 A1    Nov. 9, 2023

Related U.S. Application Data

(63) Continuation of application No. 17/988,771, filed on Nov. 17, 2022, now Pat. No. 11,749,417, which is a
(Continued)

(51) Int. Cl.
*G21D 1/00*       (2006.01)
*F02C 1/05*       (2006.01)
(Continued)

(52) U.S. Cl.
CPC .............. *G21D 1/006* (2013.01); *F02C 1/05* (2013.01); *F02C 1/10* (2013.01); *F22B 37/002* (2013.01);
(Continued)

(58) Field of Classification Search
CPC . G21D 1/006; G21D 1/02; G21D 7/00; F02C 1/05; F02C 1/10; F22B 37/002; G21C 15/24
(Continued)

(56) References Cited

U.S. PATENT DOCUMENTS 6,606,860 B2    8/2003    McFarland
6,629,413 B1    10/2003   Wendt et al.
(Continued)

OTHER PUBLICATIONS

International Search Report and Written Opinion issued on Jan. 8, 2019, in International Application No. PCT/US18/49282, filed on Aug. 31, 2018 (5 pages).

*Primary Examiner* — Jack W Keith
*Assistant Examiner* — Daniel Wasil
(74) *Attorney, Agent, or Firm* — MILLBURN IP PLLC

(57) ABSTRACT

A power conversion system for converting thermal energy from a heat source to electricity is provided. The system includes a chamber including an inner shroud having an inlet and an outlet and defining an internal passageway between the inlet and the outlet through which a working fluid passes. The chamber also includes an outer shroud substantially surrounding the inner shroud. The chamber includes a source heat exchanger disposed in the internal passageway, the source heat exchanger being configured to receive a heat transmitting element associated with the heat source external to the chamber, and to transfer heat energy from the heat transmitting element to the working fluid. The system also includes a compressor disposed adjacent the inlet of the inner shroud and configured to transfer energy from the compressor to the working fluid, and an expander disposed adjacent the outlet of the inner shroud.

17 Claims, 7 Drawing Sheets

Related U.S. Application Data continuation of application No. 16/641,229, filed as application No. PCT/US2018/049282 on Aug. 31, 2018, now Pat. No. 11,538,600.

(60) Provisional application No. 62/552,532, filed on Aug. 31, 2017.

(51) Int. Cl.
    *F02C 1/10*     (2006.01)
    *F22B 37/00*     (2006.01)
    *G21D 1/02*     (2006.01)
    *G21C 15/24*     (2006.01)
    *G21D 7/00*     (2006.01)

(52) U.S. Cl.
    CPC ............... *G21D 1/02* (2013.01); *G21C 15/24* (2013.01); *G21D 7/00* (2013.01)

(58) Field of Classification Search
    USPC ........................................................ 376/317
    See application file for complete search history.

(56) References Cited

U.S. PATENT DOCUMENTS

| | | |
|---|---|---|
| 8,596,068 B2 | 12/2013 | Staffend |
| 10,544,753 B2 | 1/2020 | Filippone |
| 2016/0195017 A1* | 7/2016 | Vick ......................... F02C 7/08 |
| | | 60/39.511 |

* cited by examiner

POWER CONVERSION SYSTEM

CROSS-REFERENCE TO RELATED APPLICATIONS

This application is a continuation of U.S. Non-Provisional patent application Ser. No. 17/988,771, filed on Nov. 17, 2022, which is a continuation of U.S. Non-Provisional patent application Ser. No. 16/641,229, filed on Feb. 21, 2020, which is a U.S. National Stage Application of PCT International Application No. PCT/US18/49282, filed on Aug. 31, 2018, which claims priority to U.S. Provisional Patent Application No. 62/552,532, filed on Aug. 31, 2017. Contents of the above-mentioned applications are incorporated herein by reference in their entirety.

TECHNICAL FIELD

The present disclosure relates generally to nuclear power generators. In particular, various embodiments of the present disclosure relate to power conversion systems and methods for use in nuclear power generators.

DESCRIPTION OF RELATED ART

A nuclear power generator contains a nuclear core for producing thermal energy during normal operation. After shutdown, the nuclear core still produces decay heat, and the amount of decay heat after shutdown is generally proportional to the power generation history and power density of the nuclear core. To avoid overheating of the nuclear core after shutdown, decay heat energy must be transferred from the nuclear core by redundant heat transfer mechanisms, which are generally supplied by decay heat removal systems external to the nuclear core. These heat transfer systems may require complex piping networks to connect the pressure vessel containing the nuclear core to heat exchangers generally located far away from the pressure vessel. Further, the coolant circulating between the nuclear core and the heat exchangers may be either actively circulated by electrically driven pumps and/or blowers or passively circulated via gravity-driven natural circulation mechanisms.

Independent of their sizes, modern nuclear reactors rely on redundant decay heat removal systems that are generally combinations of passive and active systems. These systems are formed by components that are generally external to the pressure vessel containing the nuclear core and, therefore, result in a complex system of redundant piping, valves, and heat exchangers for passive systems with the addition of pumps/blowers and motive power managed and monitored by control systems and cabling.

Many advanced reactor designs include melt-resistant nuclear cores equipped with various passive heat transfer mechanisms. While providing highly reliable heat source, however, these nuclear cores may be sealed within their pressurized vessels and, therefore, conventional heat removal systems with complex networks of balance-of-plant components may not be suitable for use with these advanced reactor designs.

SUMMARY

Therefore, various exemplary embodiments of the present disclosure may provide an improved power conversion system that can effectively and efficiently remove heat from a nuclear core while eliminating a substantial amount of balance-of-plant typically present in a conventional nuclear power generator.

To attain the advantages and in accordance with the purpose of the invention, as embodied and broadly described herein, one aspect of the invention may provide a power conversion system for converting thermal energy from a heat source to electricity. The power conversion system may include a substantially sealed chamber having an inner shroud having an inlet and an outlet and defining an internal passageway between the inlet and the outlet through which a working fluid passes. The sealed chamber may also include an outer shroud substantially surrounding the inner shroud, such that the working fluid exiting the outlet of the inner shroud returns to the inlet of the inner shroud in a closed-loop via a return passageway formed between an external surface of the inner shroud and an internal surface of the outer shroud. The power conversion system may further include a source heat exchanger disposed in the internal passageway of the inner shroud, the source heat exchanger being configured to at least partially receive a heat transmitting element associated with the heat source external to the substantially sealed chamber, the source heat exchanger being further configured to transfer heat energy from the heat transmitting element to the working fluid passing through the source heat exchanger.

In another exemplary aspect, the power conversion system may also include a compressor disposed adjacent the inlet of the inner shroud and configured to transfer energy from the compressor to the working fluid, and an expander disposed adjacent the outlet of the inner shroud and configured to extract heat energy from the working fluid. In some exemplary aspects, the compressor and the expander may be disposed inside the outer shroud.

According to another exemplary aspect, a power conversion system for converting thermal energy from a heat source to electricity may comprise a shroud having an inlet and an outlet and defining an internal passageway between the inlet and the outlet through which a working fluid passes. The power conversion system may also include a source heat exchanger disposed in the internal passageway of the shroud, the source heat exchanger being thermally coupled to a heat transmitting element of the heat source and being configured to transfer heat energy from the heat transmitting element to the working fluid passing through the source heat exchanger.

The power conversion system may also include a compressor disposed adjacent the inlet of the shroud and configured to transfer energy from the compressor to the working fluid, and an expander disposed adjacent the outlet of the shroud and configured to extract heat energy from the working fluid. In one exemplary aspect, the compressor and the expander may be disposed inside the shroud.

According to another exemplary aspect, the power conversion system may include an inlet conduit extending from a source of the working fluid to an inlet of the compressor, and a discharge conduit extending from an outlet of the expander to the source of the working fluid.

Additional objects and advantages of the invention will be set forth in part in the description that follows, and in part will be obvious from the description, or may be learned by practice of the invention.

It is to be understood that both the foregoing summary description and the following detailed description are exemplary and explanatory only and are not restrictive of the invention.

BRIEF DESCRIPTION OF THE DRAWINGS

The accompanying drawings, which are incorporated in and constitute a part of this specification, illustrate several embodiments of the invention and together with the description, serve to explain the principles of the disclosed invention.

DETAILED DESCRIPTION OF EXEMPLARY EMBODIMENTS

Reference will now be made in detail to the exemplary embodiments of the invention, examples of which are illustrated in the accompanying drawings. Wherever possible, the same reference numbers will be used throughout the drawings to refer to the same or like parts.

Figure 1:
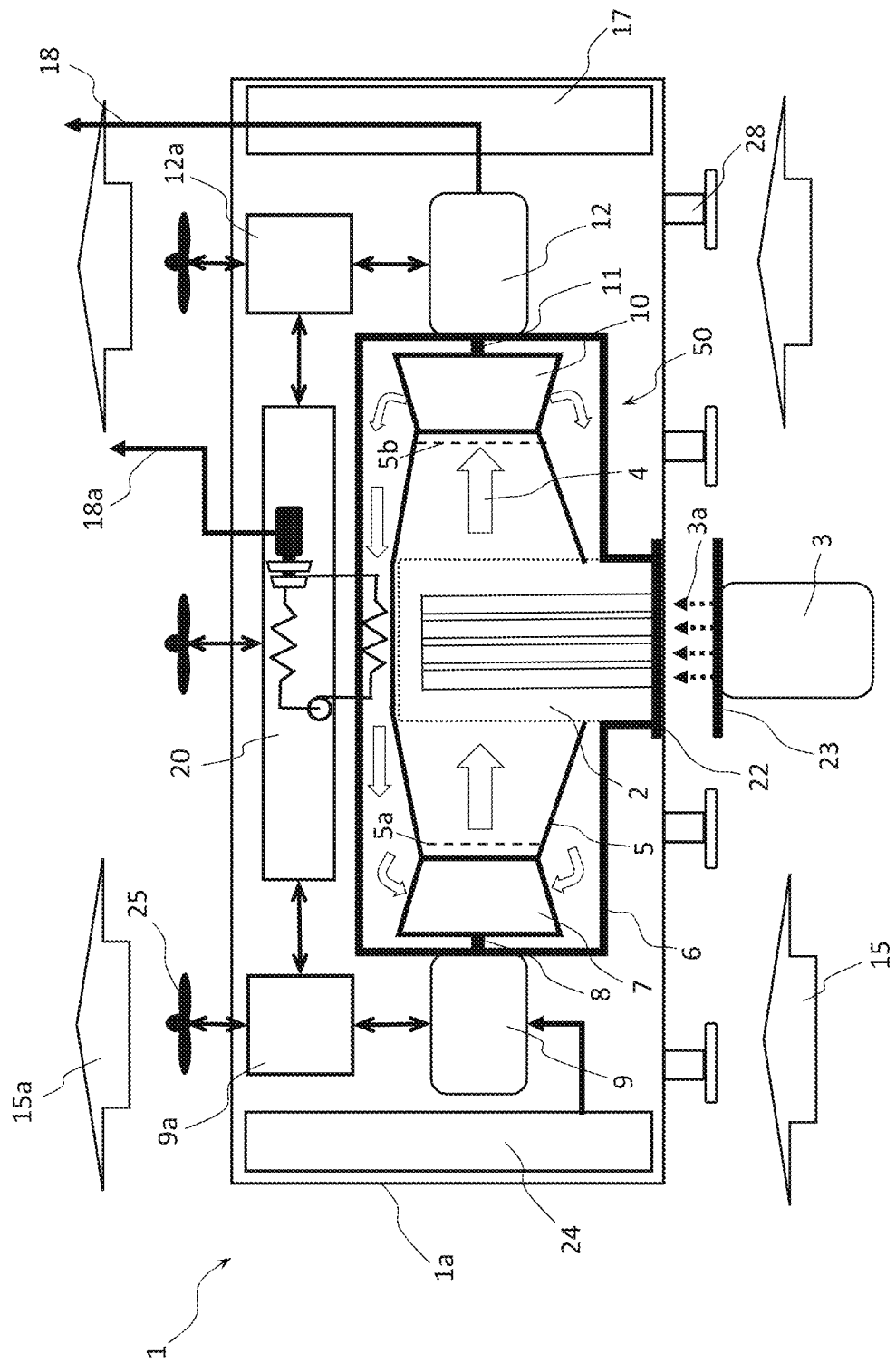
FIG. 1 is a functional schematic of a power conversion system disposed inside a transport container, according to an exemplary embodiment of the present disclosure.
Figure 2:
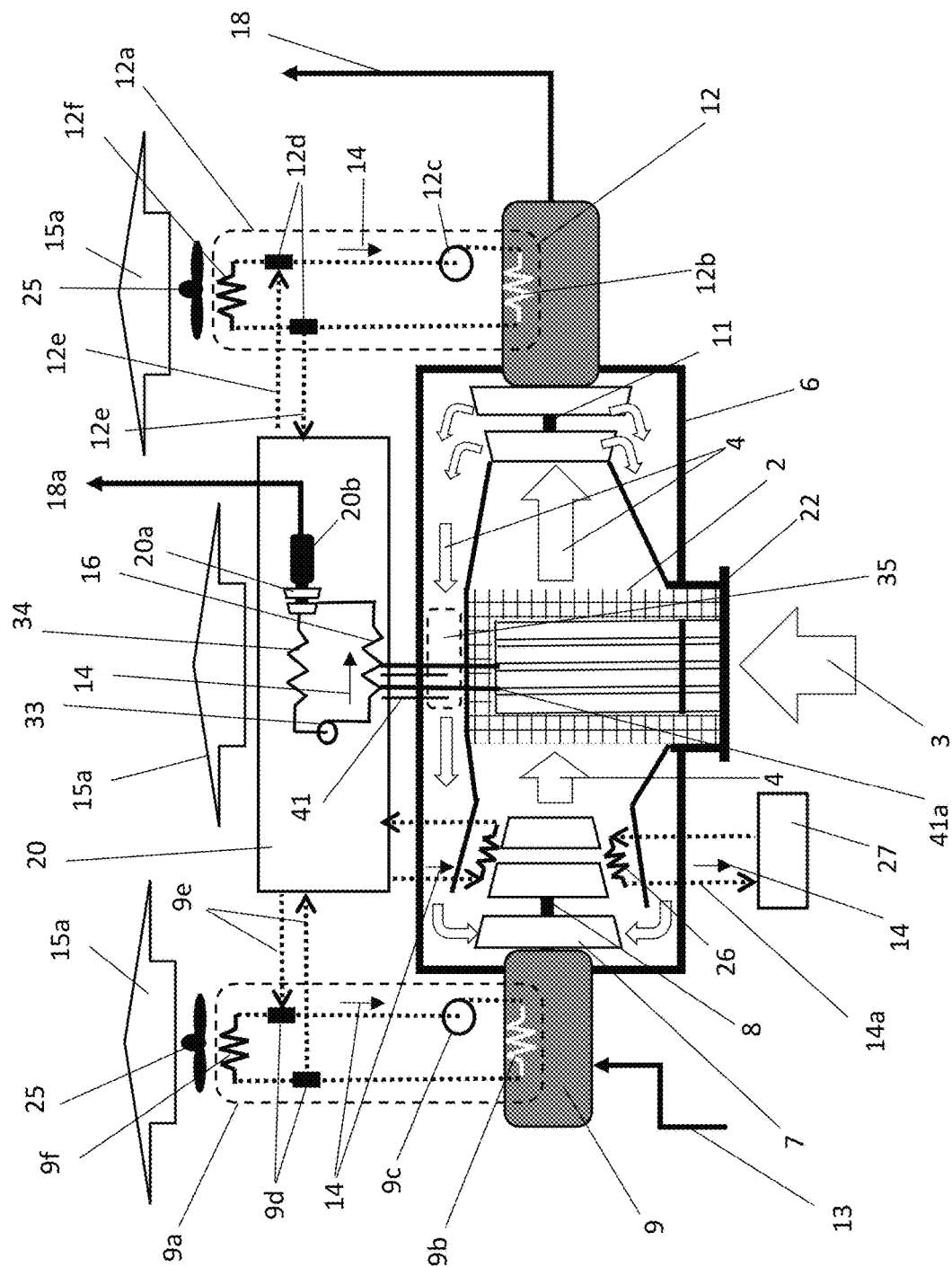
FIG. 2 is a functional schematic of the power conversion system of FIG. 1, illustrating its main components in more detail.

FIGS. 1 and 2 illustrate a power conversion system 1, according to one exemplary embodiment of the present disclosure. As shown in FIG. 1, power conversion system 1, consistent with the present disclosure, may be sufficiently compact to fit inside a transport container 1a (e.g., intermodal container), thereby making it easily transportable by any conventional transportation means, such as, for example, trucks, freight rails, and ships. Transport container 1a may include a plurality of pads 28 located at its bottom surface to provide a stable support platform from the ground. Pads 28 may be adjustable in height and may include a vibration dampening mechanism. Pads 28 also thermally separate the bottom portions of transport container 1a from the ground, or platform to be placed under the transport container 1a, to thermally insulate the container 1a bottom portions from heating said ground or platform.

Power conversion system 1 may include a closed-loop primary system for converting thermal energy from a nuclear reactor core to electricity. The thermal energy from a nuclear reactor core is depicted as a heat source 3 in FIG. 1, which may represent a heat transmitting portion of a nuclear reactor. The heat transmitting portion of the nuclear reactor may be a portion of the nuclear reactor core designed to transmit heat directly therefrom (e.g., nuclear fuel rods) or a part of any intermediary structure for transferring heat from the nuclear reactor core (e.g., heat pipes extending from a reactor core to remove heat from the reactor core). As will be described in more detail, power conversion system 1 of the present disclosure may be configured to interface with the heat transmitting portion of the nuclear reactor to remove heat therefrom and convert it into electricity. It should be understood, however, that power conversion system 1 of the present disclosure may be configured for other various types of thermal energy. For example, heat source 3 may alternatively or additionally comprise any other type of heat generating source, such as, for example, combustion heat from fossil fuel or geothermal heat.

In the exemplary embodiment shown in FIG. 1, heat source 3 (e.g., a nuclear reactor core) may be disposed underground, such that power conversion system 1 of the present disclosure may be transported to the site and positioned directly above heat source 3. It should be understood that heat source 3 may be positioned above ground, and power conversion system 1 may be readily re-configured to accommodate different locations and configurations of heat source 3.

Referring to FIG. 1, power conversion system 1 may comprise a substantially sealed chamber 50 having an inner shroud 5 and an outer shroud 6 substantially surrounding inner shroud 5. Sealed chamber 50 may enable pressurization of the closed-loop for working fluid 4 to circulate, without mixing with fluids potentially operating with heat source 3. Sealed chamber 50 may also include a source heat exchanger 2 inside inner shroud 5. Source heat exchanger 2 may be configured to at least partially receive a heat transmitting element 3a of heat source 3, such that heat from heat transmitting element 3a may be transferred to working fluid 4 inside source heat exchanger 2. The portion of source heat exchanger 2 that receives heat transmitting element 3a may include one or more recesses or pockets (depending on the configuration of heat transmitting element 3a) extending inwardly from a first flange 22 of sealed chamber 50, which is outside of the pressure boundary of sealed chamber 50 in which working fluid 4 circulates. Therefore, although heat transmitting element 3a is thermally coupled to working fluid 4 inside sealed chamber 50, it may not be in direct contact with working fluid 4.

Figure 4:
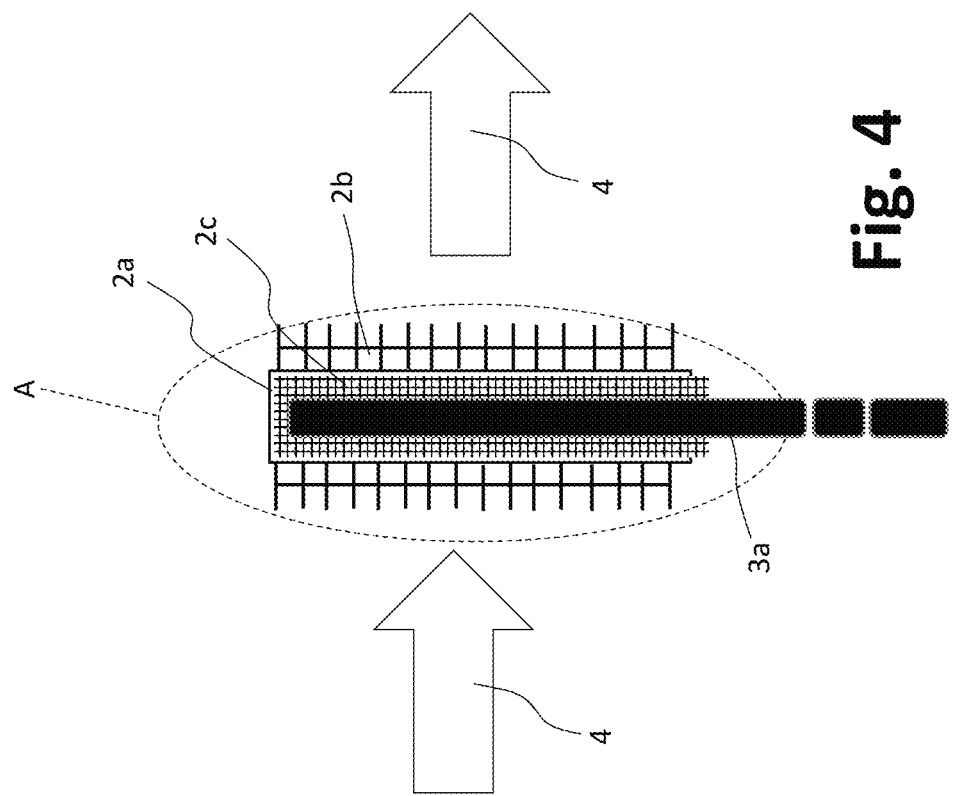
FIG. 4 is an exploded view of area A shown in FIG. 3, illustrating an exemplary configuration of a heat transmitting element of a nuclear reactor core and a heat receiving portion of a source heat exchanger.
Figure 3:
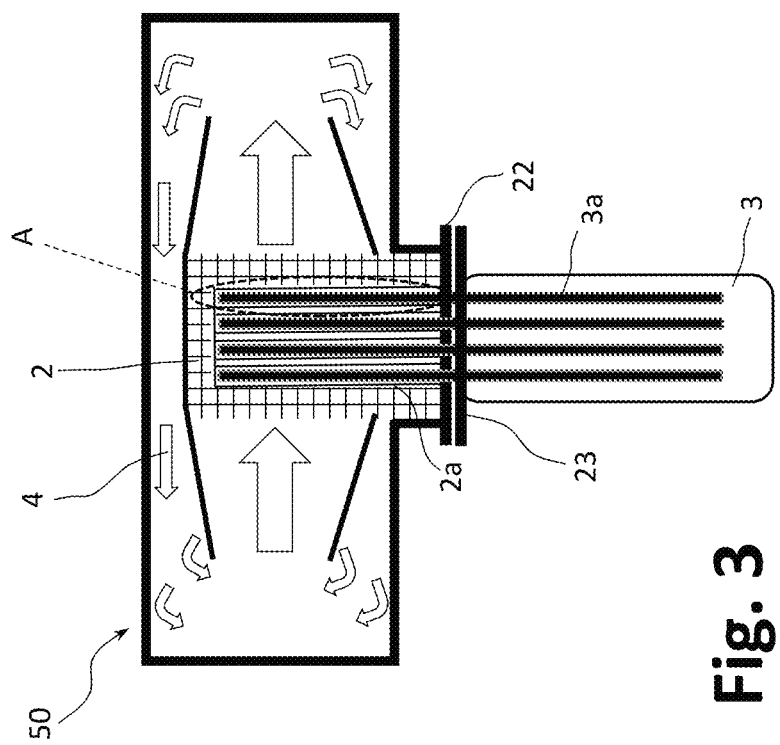
FIG. 3 is a functional schematic of a sealed chamber having a source heat exchanger configured to receive heating elements of a nuclear reactor core, according to one exemplary embodiment.

In the exemplary embodiment shown in FIGS. 3 and 4, heat transmitting element 3a may comprise a plurality of heat pipes 3a extending from heat source 3 (e.g., a nuclear reactor core), and source heat exchanger 2 may comprise a plurality of recesses 2a extending from first flange 22 and configured to receive the plurality of heat pipes 3a. Source heat exchanger 2 may define a plurality of heating channels 2b through which working fluid 4 may pass. As working fluid 4 passes through heating channels 2b, heat from heat pipes 3a may be transferred to working fluid 4.

Heat source 3 may include a second flange 23 configured to thermally and hydraulically couple heat source 3 to first flange 22, while allowing thermal expansion and contraction therebetween. First flange 22 and second flange 23 can also be configured to dampen vibrations generated by the operations of power conversion system 1. In some exemplary embodiments, at least one of first flange 22 and second flange 23 may comprise a flexible member that may also enhance sealing the gap between first flange 22 and second flange 23.

Power conversion system 1 may include an electronic controller 24, configured to control and regulate thermodynamic and electrical parameters of the Brayton cycle and the Rankine cycle of transportable power conversion system 1. The operational characteristics of controller 24 will be described in connection with the descriptions of various related components of power conversion system 1.

Each recess 2a of source heat exchanger 2 may be slightly larger than heat pipe 3 to form a gap between the outer surface of heat pipe 3 and the inner surface of recess 2a. The gap or clearance may allow heat pipe 3 and recess 2a to expand and contract without inducing mechanical stress. Recess 2a may contain a suitable heat transfer medium 2c in the gap, which may enhance heat transfer between heat pipe 3 and recess 2a. Heat transfer medium 2c may also ensure that heat pipe 3 and recess 2a remain in thermal contact during expansion and contraction.

Figure 5:
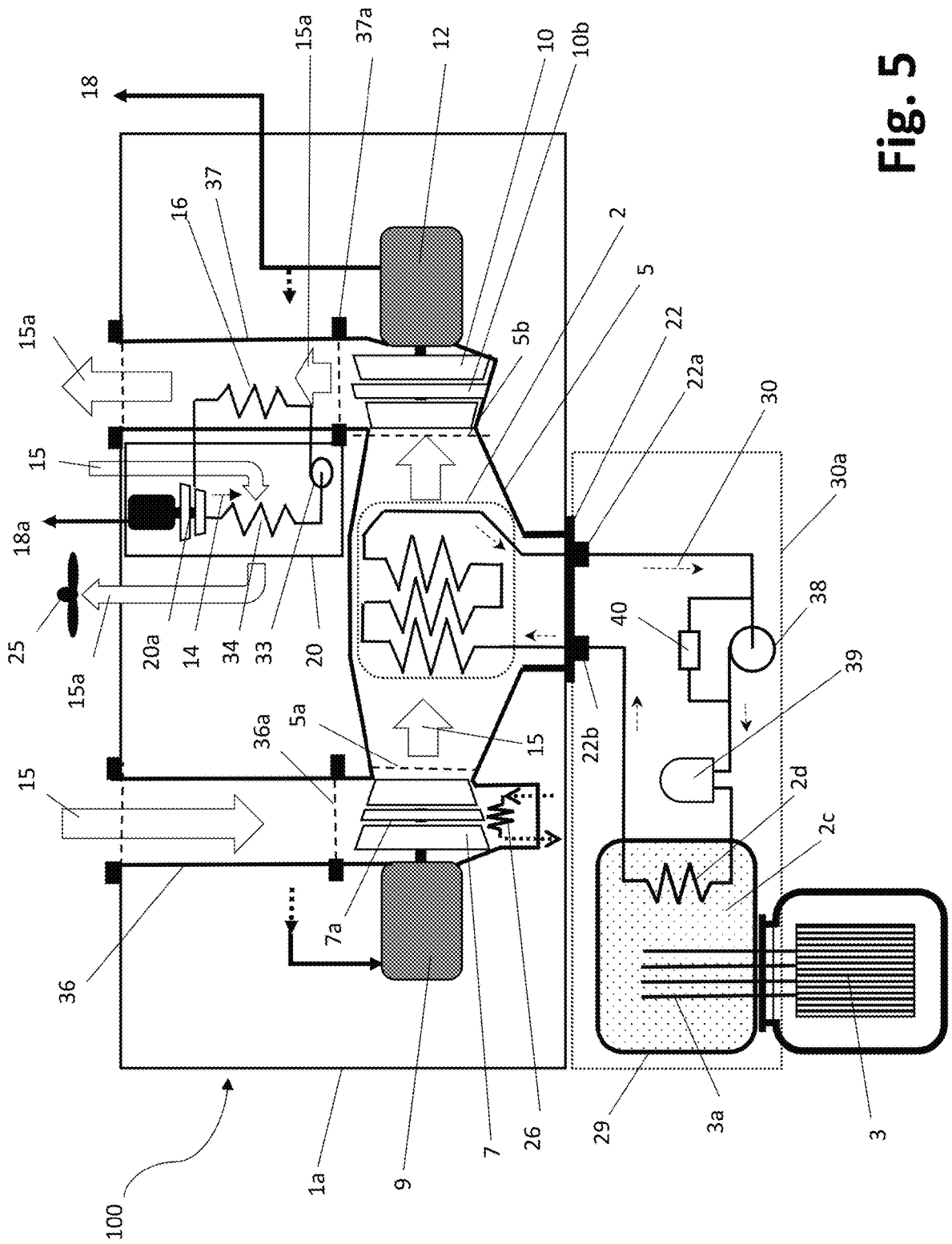
FIG. 5 is a functional schematic of a power conversion system, according to another exemplary embodiment, consistent with the present disclosure.

As shown in FIGS. 1 and 5, inner shroud 5 may include an inlet 5a and an outlet 5b and define an internal passageway between inlet 5a and outlet 5b through which working fluid 4 can pass. Source heat exchanger 2 may be disposed inside the internal passageway of inner shroud 5 between inlet 5a and outlet 5b to exchange heat energy with heat transmitting element 3a of heat source 3. As will be described in more detail herein, when working fluid 4 flows through source heat exchanger 2, heat energy from heat source 3 is transferred to working fluid 4 without working fluid 4 physically mixing with any working fluid of heat source 3. Working fluid 4 may comprise any suitable working fluid with adequate thermal-physical properties to operate under a Brayton- or Rankine-cycle thermodynamic configuration.

Power conversion system 1 may further include a compressor 7 disposed adjacent inlet 5a of inner shroud 5 and an expander 10 disposed adjacent outlet 5b of inner shroud 5. Compressor 7 may comprise turbomachinery components, such as, for example, multi-stage stator nozzles and rotary turbines or positive displacement components, configured to transfer energy from compressor 7 to working fluid 4 by compressing and/or pumping working fluid 4. Expander 10 may comprise turbomachinery components, such as, for example, multi-stage stator nozzles and rotary turbines or positive displacement components, configured to extract heat energy from working fluid 4.

Outer shroud 6 may substantially surround inner shroud 5, compressor 7, and expander 10. Outer shroud 6 may define a return passageway between the outer surface of inner shroud 5 and the inner surface of outer shroud 6. The return passageway may be configured to guide working fluid 4 exiting expander 10 to recirculate back to compressor 7. Outer shroud 6 may also be configured to structurally support the turbomachinery components of compressor 7 and expander 10.

Outer shroud 6 may also provide mechanical coupling and support for electric motor 9 and electric generator 12, while defining a sealed flange (not shown) enabling rotation of the rotary components of compressor 7 and expander 10. In some exemplary embodiments, outer shroud 6 may be configured to provide mechanically support for, and define fluid dynamic pathways of, stators 7a, 10a (FIG. 5) of rotary turbomachinery components. Similarly, inner shroud 5 may be configured to provide mechanical support for, and define fluid dynamic pathways of, stators 7a and 10a of the rotary turbomachinery components for working fluid 4 to be compresses by compressor 7.

Before entering inlet 5a of inner shroud 5, working fluid 4 is compressed and/or pumped by compressor 7. Working fluid 4 then enters inlet 5a of inner shroud 5, passes through heating channels 2b of source heat exchanger 2 to extract heat energy from one or more heat transmitting elements 3a, and exits outlet 5b of inner shroud 5. Working fluid 4 exiting outlet 5a of inner shroud 5 enters expander 10 and expands through the turbomachinery components of expander 10. Working fluid 4 discharged from expander 10 passes through the return passageway defined by inner shroud 5 and outer shroud 6 and recirculates back to compressor 7.

As shown in FIGS. 1 and 2, compressor 7 may comprise a motor shaft 8 configured to mechanically couple the rotary components of compressor 7 to an electric motor 9. Compressor 7 is driven by electric motor 9, and electric motor 9 is driven by a portion of the electricity produced by an electric generator 12 conditioned by a conditioner 17. Expander 10 may comprise a generator shaft 12 configured to mechanically couple the rotary components of expander 10 to electric generator 12. Expander 10 is driven by working fluid 4 flowing from source heat exchanger 2 and exiting inner shroud 5. Electric generator 12 may comprise power electronic components, such as, for example, IGBT-based inverters, and may produce electricity rectified and conditioned by conditioner 17. Conditioner 17 may also regulate the electricity produced by electric generator 12 to supply the conditioned electricity to a power bus 18 and to electric motor 9. The rotary components of compressor 7 and motor shaft 8 and the rotary components of expander 10 and second rotary component 11 may form distinct turbomachinery rotary components optimized to pump/compress or expand independently of one another.

In the disclosed exemplary embodiment, electric motor 9 and electric generator 12 may be cooled by a motor cooling circuit 9a (FIG. 2) and a generator cooling circuit 12a, respectively. Motor cooling circuit 9a and generator cooling circuit 12a may use a working fluid 14 different from working fluid 4 of the closed-loop primary system. Working fluid 14 may comprise a thermal-oil, an organic fluid, or any fluid with adequate thermal-physical properties to operate within the temperature and pressure ranges suitable for the Brayton- and Rankine-cycle components of power conversion system 1.

As best shown in FIG. 2, motor cooling circuit 9a may comprise a recirculation pump 9c configured to recirculate working fluid 14, a motor heat exchanger 9b configured to receive thermal energy generated by electric motor 9, and a radiator 9f configured to transfer thermal energy from electric motor 9 to the ultimate heat sink. In this exemplary embodiment, motor cooling circuit 9a may include a set of three-way valves 9d to transfer working fluid 14 to a secondary conversion system having components operating under a Rankine cycle (hereinafter referred to as Rankine engine 20) by hydraulic tubing 9e.

Similarly, generator cooling circuit 12a may comprise a recirculation pump 12c configured to recirculate working fluid 14, a generator heat exchanger 12b configured to receive thermal energy generated by electric generator 12, and a radiator 12f configured to transfer thermal energy from electric generator 12 to the ultimate heat sink. In this exemplary embodiment, generator cooling circuit 12a may include a set of three-way valves 12d configured to regulate the mass flow rate of working fluid 14 flowing to and from Rankine engine 20 via hydraulic tubing 12e.

Three-way valves 9d of motor cooling circuit 9a and three-way valves 12d of generator cooling circuit 12a may be controlled by controller 24. The working fluid circulating through motor cooling circuit 9a and generator cooling circuit 12a may be different than working fluid 14. Any fluid with suitable thermal-physical properties for Rankine engine 20 can be used.

Rankine engine 20 may comprise a recuperator 16 configured to transfer thermal energy from working fluid 4 to working fluid 14. Ranking engine 20 may also comprise a pump 33 configured to pressurize working fluid 14, a condenser 34 configured to transfer thermal energy from working fluid 14 to the ultimate heat sink (e.g., environmental air), an expander 20a configured to expand working fluid 14 and convert thermal energy into mechanical energy, and a generator 20b coupled to expander 20a and configured to convert mechanical energy from expander 20a into electrical energy 18a. Electrical energy 18a may be conditioned by controller 24. Expander 20a may comprise multi-stage turbomachinery components or positive displacement components.

In one exemplary embodiment, Rankine engine 20 may be thermally coupled to working fluid 4 by positioning at least a portion of recuperator 16 in a return passageway 35 (FIG. 2) between the outer surface of inner shroud 5 and the inner surface of outer shroud 6. Alternatively or additionally, recuperator 16 may be thermally coupled to outer shroud 6. In another exemplary embodiment, recuperator 16 may include a plurality of heat transfer fins 41 for thermally coupling working fluid 4 in return passageway 35 to recuperator 16. Overall, the components of Rankine engine 20 may be thermally coupled to working fluid 4 and thermally and hydraulically coupled to working fluid 14 and discharge thermal energy to the ultimate heat sink. The ultimate heat sink may be environmental air, or water if power conversion system 1 is submerged under water.

In some exemplary embodiments, a portion of recuperator 16 may be thermally coupled to a plurality of extended fins 41a that may extend to source heat exchanger 2, such that recuperator 16 is directly thermally coupled to heat transmitting element 3a. Rankine engine 20 with this exemplary configuration may enable decay heat removal from heat source 3 by exchanging decay heat energy with the ultimate heat sink.

Rankine engine 20 may be thermally and hydraulically coupled to motor cooling circuit 9a to recover thermal energy generated by electric motor 9 and may regulate, via three-way valves 9d, operational parameters of working fluid 14, such as, for example, pressure, temperature, and mass-flow-rate. Similarly, Rankine engine 20 may also be thermally and hydraulically coupled to generator cooling circuit 12a to recover thermal energy generated by generator 12 and may regulate operational parameters of working fluid 14 via three-way valves 12d.

For configurations where the ultimate heat sink is environmental air 15, one or more passive or active cooling devices 25, such as, for example, cooling fans, may be used to circulate heated air 15a and cool down the heat exchangers of intercooler 26 and recuperator 16. Cooling devices 25 may be regulated by controller 24. In some exemplary embodiments, cooling devices 25 may be positioned to direct environment air 15 to flow upwardly from the bottom to the top to take advantage of buoyancy forces as it changes density proportionally to its temperature. Environment air 15 exchanges thermal energy with condenser 34 and heat transfer surfaces 1c of transportable container 1a.

According to another exemplary embodiment, environment air 15 may flow sideways with respect to transport container 1. In still another exemplary embodiment, environment air 15 may flow into and out from the top portion of transport container 1a.

In some exemplary embodiments, compressor 7 may include an intercooler 26 configured to exchange energy between working fluid 4 and working fluid 14. As shown in FIG. 2, Rankine engine 20 may be thermally coupled to intercooler 26 to recover waste thermal energy generated by compressor 7 by regulating the flow of working fluid 14. In one exemplary embodiment, controller 24 may be configured to control one or more valves 27 to regulate the flow of working fluid 14. Intercooler 26 may use working fluid 14a different from working fluid 14 of Rankine engine 20.

FIG. 5 schematically illustrates a power conversion system 100, according to another exemplary embodiment of the present disclosure. This exemplary embodiment may differ from the exemplary embodiments shown in FIGS. 1 and 2 in that, among other things, power conversion system 100 may employ an open-loop system for converting thermal energy from heat source 3 to electricity. For example, as will be described in more detail herein, power conversion system 100 may utilize an intermediary thermodynamic system 30a for transferring heat energy from heat source 3 to source heat exchanger 2.

As shown in FIG. 5, intermediary thermodynamic system 30a may comprise an intermediary vessel 29 to which a plurality of heat transmitting elements 3a may extend from heat source 3. Intermediary vessel 29 may be filled with a suitable medium 2c for effectively removing heat from heat transmitting elements 3a. Although not illustrated in detail, intermediary vessel 29 may include a suitable structure for interfacing with heat source 3. For example, intermediary vessel 29 may include an interface structure similar to first flange 22 and second flange 23 of power conversion system 1 shown in FIGS. 1 and 2. In an alternative embodiment, intermediary vessel 29 and heat source 3 may form a unitary pressure boundary in which medium 2c of intermediary vessel 29 mixes with a coolant inside heat source 3.

To transfer the heat from intermediary vessel 29, intermediary thermodynamic system 30a may include an intermediary heat exchanger 2d disposed inside intermediary vessel 29, or thermally coupled to vessel 29. Intermediary thermodynamic system 30a may also include an auxiliary pump 38 configured to circulate a working fluid 30, an actuator 40 configured to control the flow of working fluid 30, and a pressurizer 39 configured to maintain pressure of working fluid 30 and/or to accommodate temperature-induced volume changes of working fluid 30. Accordingly, working fluid 30 is configured to transfer thermal energy from intermediary vessel 29 to source heat exchanger 2. Working fluid 30 may comprise a liquid metal or any other suitable fluid with proper thermal-physical properties. In one exemplary embodiment, working fluid 30 may be the same as working fluid 14. In still another exemplary embodiment, working fluid 30 may be the same as working fluid 4.

Power conversion system 100 may comprise a first flange 22 configured to thermally and hydraulically connect to heat source 3 via intermediary thermodynamic system 30a. First flange 22 may comprises at least one inlet port 22a and at least one outlet port 22b for hydraulically connecting intermediary heat exchanger 2d to source heat exchanger 2.

As shown in FIG. 5, source heat exchanger 2 may be disposed inside inner shroud 5 that is, in this configuration, exposed to the fluids representing the ultimate heat sink. In other words, inner shroud 5 may define an open internal passageway between inlet 5a and outlet 5b through which a fluid representing the ultimate heat sink (e.g., environment air or water) may flow. In this exemplary embodiment, power conversion system 100 may comprise an inlet conduit 36 extending from the ultimate heat sink (e.g., outside of transport container 1a) to a compressor inlet 36a. Similarly, power conversion system 100 may comprise a discharge conduit 37 extending from an expander outlet 37a to the ultimate heat sink.

Power conversion system 100 may include a recuperator 16 configured to transfer thermal energy from heated fluid 15a discharged from expander 10 to working fluid 14 circulating in Rankine engine 20. Recuperator 16 may be disposed within, or otherwise thermally coupled to, discharge conduit 37 and, as the heat source of Rankine engine 20, may be configured to extract heat from heated fluid 15a. Various turbomachinery components in power conversion system 100 of FIG. 5 may be similar to those shown and/or described with reference to FIGS. 1 and 2 and, therefore, any detailed description will be omitted herein.

As described above, the open-loop thermodynamic cycle executed by compressor 7 and expander 10 utilizes fluid 15 from the ultimate heat sink. As fluid 15 enters compressor 7 at inlet 36a, it is compressed and then flown into source heat exchanger 2 to remove thermal energy from working fluid 30 of intermediary thermodynamic system 30a. Fluid 15 then expands through expander 20 to convert the thermal energy in heated fluid 15a into electrical energy via electrical generator 12. Heated fluid 15a then flows through expander outlet 37a and transfers thermal energy to recuperator 16 prior to exiting discharge conduit 37.

Figure 6:
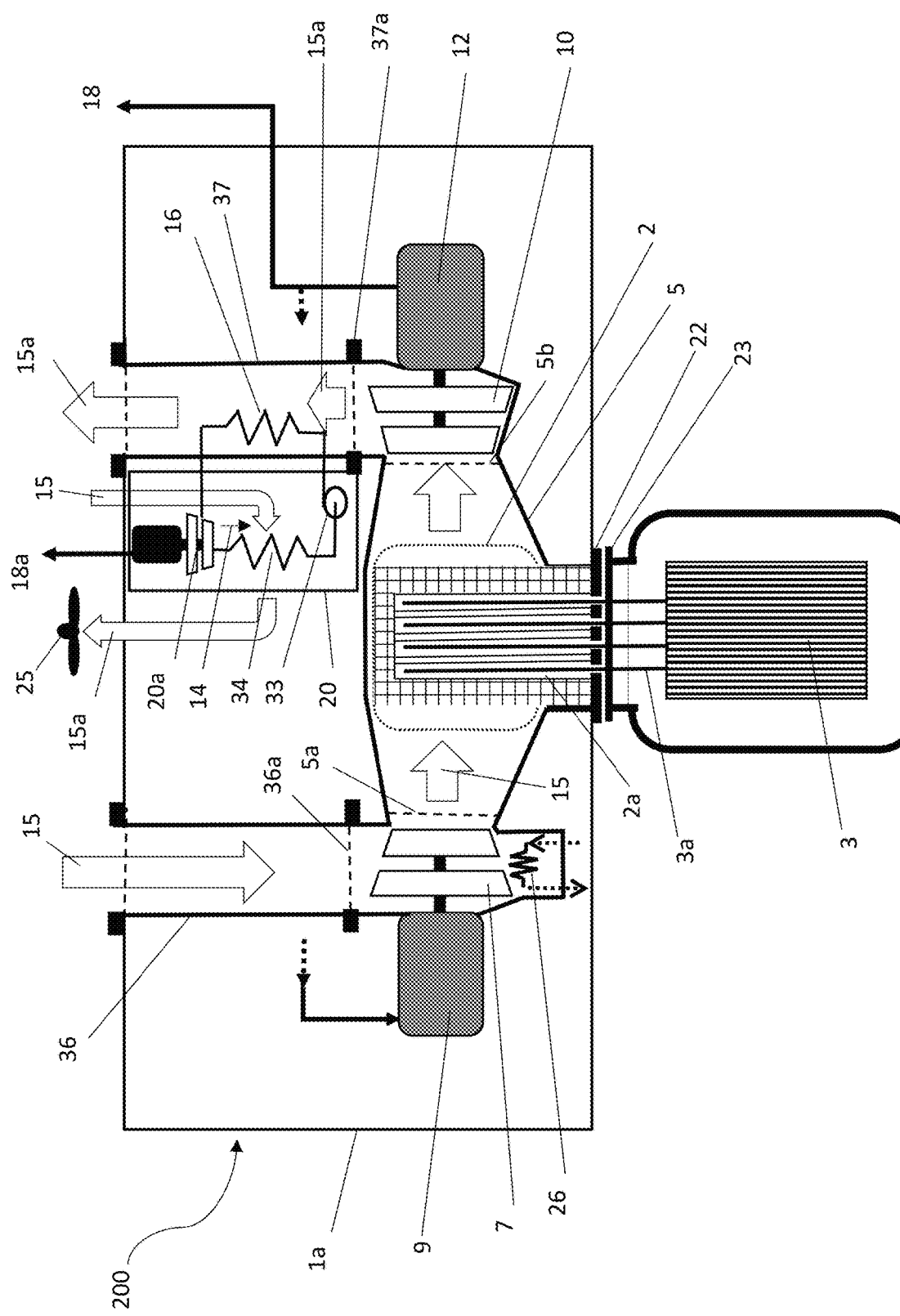
FIG. 6 is a functional schematic of a power conversion system, according to still another exemplary embodiment, consistent with the present disclosure.

FIG. 6 schematically illustrates a power conversion system 200, according to another exemplary embodiment of the present disclosure. Similar to power conversion system 100 shown in FIG. 5, power conversion system 200 of this exemplary embodiment is an open-loop system utilizing the fluid of the ultimate heat sink to convert thermal energy from heat source 3 to electricity. Power conversion system 200 may differ from power conversion system 100 of FIG. 5 in that, among other things, source heat exchanger 2 can be directly thermally coupled to heat transmitting elements 3a of heat source 3.

Figure 7:
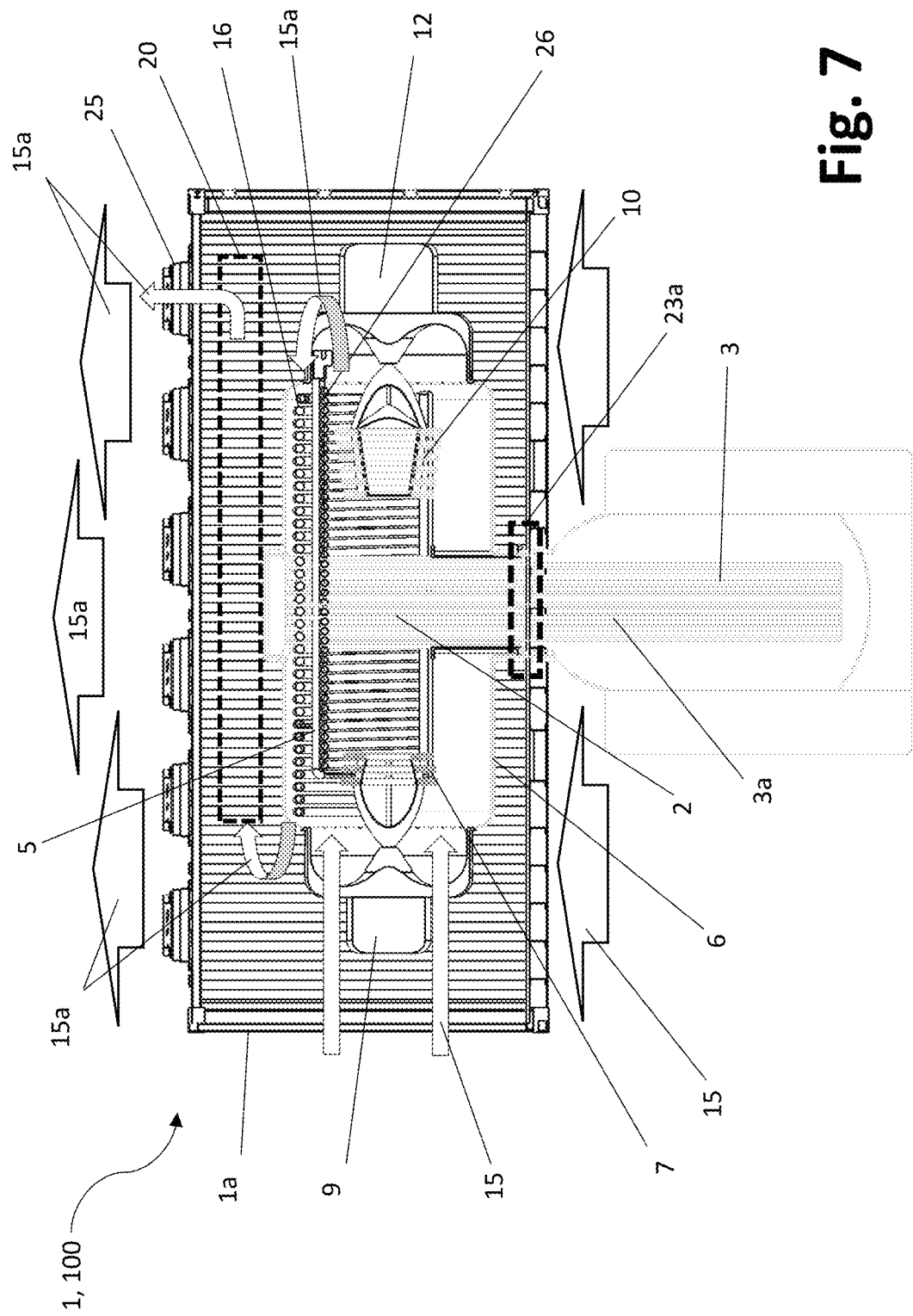
FIG. 7 is a cross-sectional view of a power conversion system, according to still another exemplary embodiment, consistent with the present disclosure.

FIG. 7 illustrates a cross-section view of a power conversion system 1, according to still another exemplary embodiment consistent with the present disclosure. In this exemplary embodiment, intercooler 26 may be positioned in the internal passageway of working fluid 4 (for closed-loop configurations) or fluid 15 of ultimate heat sink (for open-loop configurations) inside inner shroud 5, and recuperator 16 may substantially surround outer shroud 6 and intercooler 26. Accordingly, the working fluid used to convert thermal energy from heat source 3 can be either working fluid 4 circulating in a closed-loop configuration or fluid 15 taken from the ultimate heat sink (e.g., the environment surrounding transport container 1a) in an open-loop configuration.

In an open-loop configuration, environment air may be suctioned and compressed by compressor 7. The energy added to the air by compressor 7 may be removed by intercooler 26, which may transfer this removed energy to Rankine engine 20 for executing waste heat recovery functions. The compressed air flows through source heat exchanger 2 to increase its energy content and expands through expander 10. As the air is discharged at the outlet of expander 10, it may exchange energy with recuperator 16, which transfers the recovered energy to Rankine engine 20 for further conversion into electricity. Rankine engine 20 may then reject thermal energy to the ultimate heat sink via one or more cooling device 25.

Figure 8:
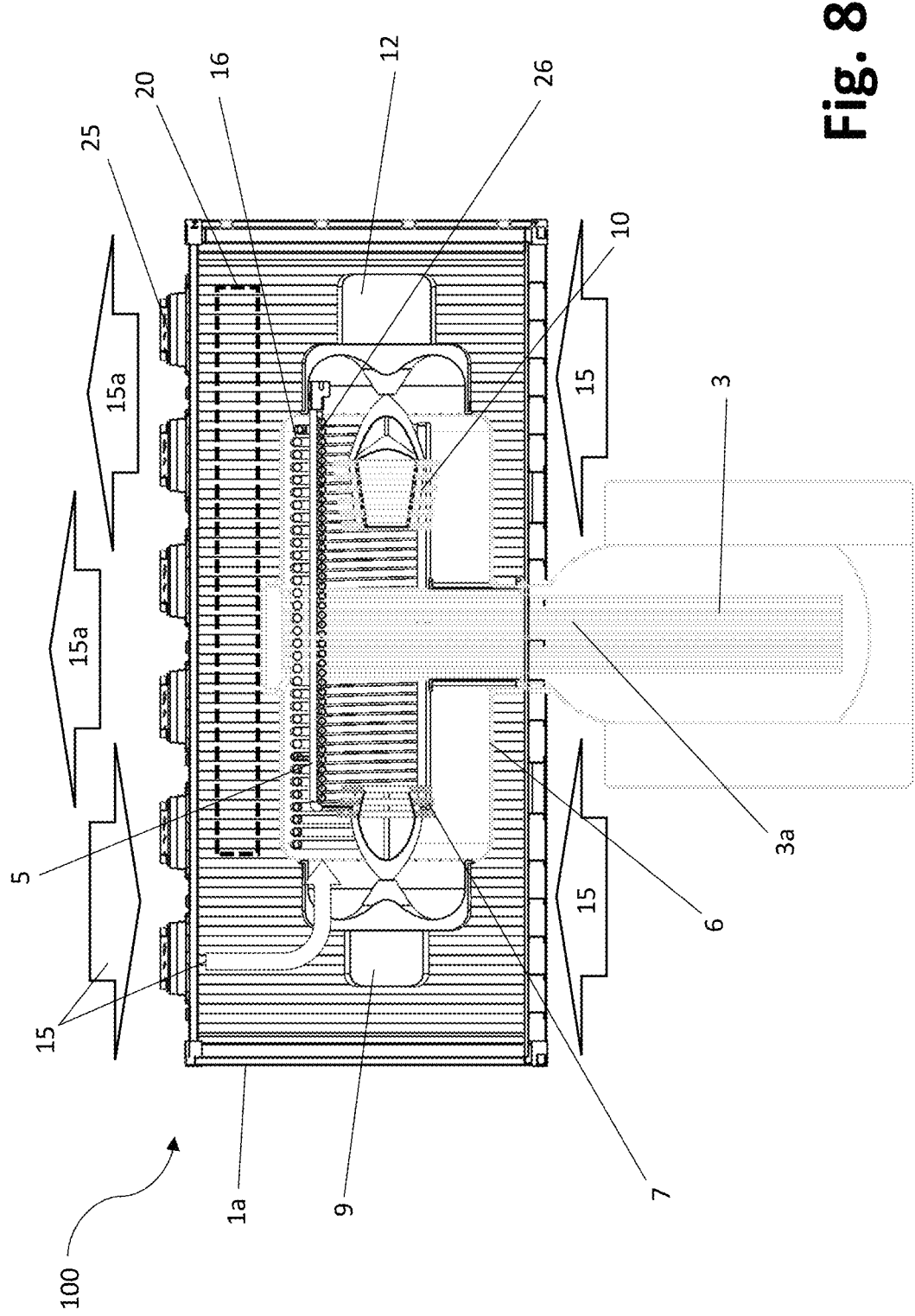
FIG. 8 is a cross-sectional view of a power conversion system, according to still another exemplary embodiment, consistent with the present disclosure.

FIG. 8 illustrates a cross-sectional view of a power conversion system 100, according to still another exemplary embodiment. Power conversion system 100 of FIG. 8 may be an open-loop system, where fluid 15 (e.g., environment air) may be drawn into compressor 7 through inlet ports positioned substantially in the upper portion (e.g., on the top surface) of transport container 1a.

While the present invention is described herein with reference to illustrative embodiments for particular applications, it should be understood that the invention is not limited thereto. The preceding description of the disclosed embodiments is provided to enable any person skilled in the art to make or use the claims. Various modifications to these embodiments will be readily apparent to those skilled in the art, and the generic principles defined herein may be applied to other embodiments and implementations.

What is claimed is:

1. A power conversion system for converting thermal energy from a heat source to electricity, comprising:
   an shroud including an inlet and an outlet;
   an inlet conduit and an outlet conduit respectively hydraulically coupled to the inlet and the outlet of the shroud for an environmental working fluid to flow through the inlet conduit, a space enclosed by the shroud, and the outlet conduit;
   a compressor disposed adjacent the inlet of the shroud, and configured to suction the environmental working fluid into the inlet conduit from an external environment, and compress the environmental working fluid into the space enclosed by the shroud through the inlet;
   a source heat exchanger configured to transfer thermal energy to the compressed environmental working fluid to heat up the compressed environmental working fluid;
   a flange configured to seal a portion of the shroud, the flange including an inlet port and an outlet port;
   an intermediary thermodynamic system configured to transfer thermal energy from a heat source to the source heat exchanger through the inlet port and outlet port;
   wherein the intermediary thermodynamic system includes:
      a pump configured to circulate a working fluid within the intermediary thermodynamic system;
      an intermediary heat exchanger configured to transfer thermal energy from the heat source to the working fluid circulating within the intermediary thermodynamic system;
      a heat transfer medium thermally coupled to the intermediary heat exchanger and the heat source; and
      an intermediary pressure vessel configured to store and transfer thermal energy from the heat source to the heat transfer medium;
   an expander disposed adjacent the outlet of the shroud and configured to convert thermal energy of the heated environmental working fluid exiting the outlet into rotative energy; and
   an electric generator mechanically coupled with the expander and configured to convert the rotative energy into electricity.

2. The power conversion system of claim 1, wherein the inlet conduit is positioned radially with respect to the compressor.

3. The power conversion system of claim 1, wherein the inlet conduit is positioned axially with respect to the compressor.

4. The power conversion system of claim 1, wherein the compressor includes multistage rotary components and stator components with the stator components mechanically coupled to the shroud.

5. The power conversion system of claim 4, wherein the compressor includes an intercooler heat exchanger configured to cool down the environmental working fluid by thermal exchange.

6. The power conversion system of claim 5, wherein the intercooler heat exchanger is configured to transfer thermal energy from the environmental working fluid flowing through the compressor to cool down the environmental working fluid before the environmental working fluid is compressed into the space enclosed by the shroud.

7. The power conversion system of claim 1, wherein the source heat exchanger is configured to transfer thermal energy from the heat source to the environmental working fluid.

8. The power conversion system of claim 1, wherein the expander includes multistage rotary components and stator components, with the stator components mechanically coupled to the shroud, to expand the heated environmental working fluid.

9. The power conversion system of claim 1, wherein the multistage rotary components of the expander are mechanically coupled to the electric generator.

10. The power conversion system of claim 1, wherein the heat source includes a nuclear reactor.

11. The power conversion system of claim 1, wherein the pump is configured to circulate the working fluid through the source heat exchanger and the intermediary heat exchanger.

12. The power conversion system of claim 1, further comprising a pump configured to circulate a working fluid to execute a Rankine engine.

13. The power conversion system of claim 1, further comprising a recuperator heat exchanger configured to transfer thermal energy from the heated environmental working fluid exiting from the outlet to a working fluid circulating in a Rankine engine, to convert the thermal energy into conditioned electricity.

14. The power conversion system of claim 1, further comprising an electric conditioner configured to regulate the electricity generated by the electric generator.

15. A system, comprising:
a power conversion system for converting thermal energy from a heat source to electricity, the power conversion system comprising:
an shroud including an inlet and an outlet;
an inlet conduit and an outlet conduit respectively hydraulically coupled to the inlet and the outlet of the shroud for an environmental working fluid to flow through the inlet conduit, a space enclosed by the shroud, and the outlet conduit;
a compressor disposed adjacent the inlet of the shroud, and configured to suction the environmental working fluid into the inlet conduit from an external environment, and compress the environmental working fluid into the space enclosed by the shroud through the inlet;
a source heat exchanger configured to transfer thermal energy to the compressed environmental working fluid to heat up the compressed environmental working fluid;
a flange configured to seal a portion of the shroud, the flange including an inlet port and an outlet port;
an intermediary thermodynamic system configured to transfer thermal energy from a heat source to the source heat exchanger through the inlet port and outlet port;
wherein the intermediary thermodynamic system includes:
a pump configured to circulate a working fluid within the intermediary thermodynamic system;
an intermediary heat exchanger configured to transfer thermal energy from the heat source to the working fluid circulating within the intermediary thermodynamic system;
a heat transfer medium thermally coupled to the intermediary heat exchanger and the heat source; and
an intermediary pressure vessel configured to store and transfer thermal energy from the heat source to the heat transfer medium;
an expander disposed adjacent the outlet of the shroud and configured to convert thermal energy of the heated environmental working fluid exiting the outlet into rotative energy; and
an electric generator mechanically coupled with the expander and configured to convert the rotative energy into electricity; and
a transport container containing the power conversion system.

16. The system of claim 15, further comprising a condenser heat exchanger, and wherein at least one surface of the transport container is thermally coupled to the condenser heat exchanger.

17. The system of claim 15, further comprising a fan associated with in the transport container to force a flow of an environmental fluid to and from an interior of the transport container.

* * * * *